United States Patent
de Groot

(10) Patent No.: US 9,576,720 B2
(45) Date of Patent: Feb. 21, 2017

(54) TRANSFORMER

(71) Applicant: NXP B.V., Eindhoven (NL)

(72) Inventor: Humphrey de Groot, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/857,582

(22) Filed: Sep. 17, 2015

(65) Prior Publication Data

US 2016/0181008 A1    Jun. 23, 2016

(30) Foreign Application Priority Data

Dec. 17, 2014  (EP) ..................... 14198652

(51) Int. Cl.
*H01F 27/28* (2006.01)
*H02M 7/217* (2006.01)
(Continued)

(52) U.S. Cl.
CPC ...... *H01F 27/2885* (2013.01); *H01F 27/2823* (2013.01); *H01F 27/29* (2013.01); *H01F 27/385* (2013.01); *H01F 38/42* (2013.01); *H02M 1/44* (2013.01); *H02M 3/335* (2013.01); *H02M 3/33592* (2013.01); *H02M 7/217* (2013.01); *H01F 27/289* (2013.01);
(Continued)

(58) Field of Classification Search
CPC .................................................. H01F 27/2885
See application file for complete search history.

(56) References Cited

U.S. PATENT DOCUMENTS 3,963,975 A * 6/1976 Gauper, Jr. ............. H01F 27/34
                                                        307/150
5,724,236 A * 3/1998 Oglesbee ................ H02M 3/28
                                                         363/131
(Continued)

FOREIGN PATENT DOCUMENTS

| EP | 2 797 091 A1 | 10/2014 |
| JP | 2005-136314 A | 5/2005 |
| WO | 2012/028787 A2 | 3/2012 |

OTHER PUBLICATIONS

Extended European Search Report for EP Patent Appln. No. 14198652.1 (Jun. 30, 2015).

*Primary Examiner* — Emily P Pham

(57) ABSTRACT

A transformer (900) comprising a primary-side auxiliary winding (976, wherein in use the primary-side auxiliary winding (976) is configured such that a first electric potential distribution is induced in the primary-side auxiliary winding (976); and a secondary-side auxiliary winding (982) configured such that a second electric potential distribution is induced in the secondary-side auxiliary winding (982). The primary-side auxiliary winding (976) is physically located between (a) a main pair of windings; and (b) the second-side auxiliary winding (982). A first portion of the secondary-side auxiliary winding (982) is positioned adjacent to a shield-portion of the primary-side auxiliary winding (976) such that the first electric potential distribution matches the second electric potential distribution: (1) along the respective lengths of the first portion of the secondary-side auxiliary winding (982) and the shield-portion of the primary-side auxiliary winding (975); and (2) over a frequency range that is greater than a particular threshold frequency.

15 Claims, 8 Drawing Sheets

(51) Int. Cl.

| | | |
|---|---|---|
| *H01F 27/29* | (2006.01) | |
| *H01F 27/38* | (2006.01) | |
| *H01F 38/42* | (2006.01) | |
| *H02M 1/44* | (2007.01) | |
| *H02M 3/335* | (2006.01) | |
| *H02M 1/00* | (2006.01) | |
| *H02M 1/12* | (2006.01) | |

(52) U.S. Cl.
CPC ............ *H02M 2001/0006* (2013.01); *H02M 2001/0064* (2013.01); *H02M 2001/123* (2013.01)

(56) References Cited

U.S. PATENT DOCUMENTS

| | | | | |
|---|---|---|---|---|
| 7,123,121 | B2* | 10/2006 | Park | H01F 27/367 336/84 C |
| 7,164,338 | B2* | 1/2007 | Odell | H01F 27/34 336/181 |
| 8,023,294 | B2* | 9/2011 | Ryan | H02M 1/14 323/335 |
| 9,177,714 | B2* | 11/2015 | Espino | H01F 27/362 |
| 2008/0238375 | A1* | 10/2008 | Chen | H02M 1/44 323/234 |
| 2010/0060255 | A1 | 3/2010 | Ouyang et al. | |
| 2014/0334198 | A1 | 11/2014 | Yang et al. | |

* cited by examiner

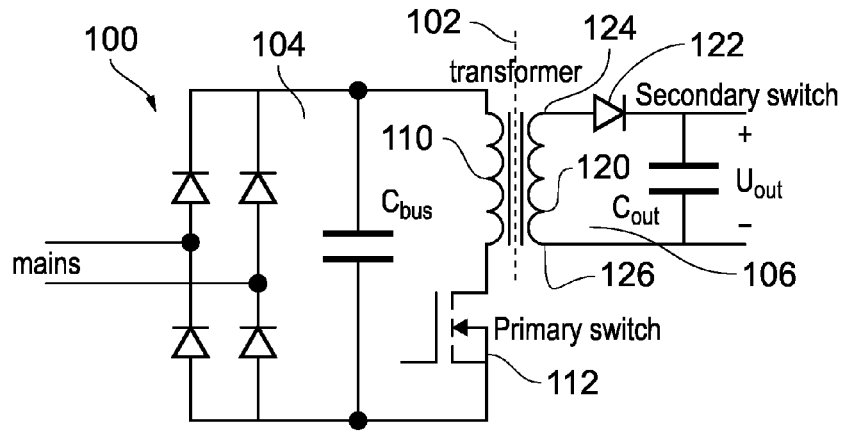
FIG. 1
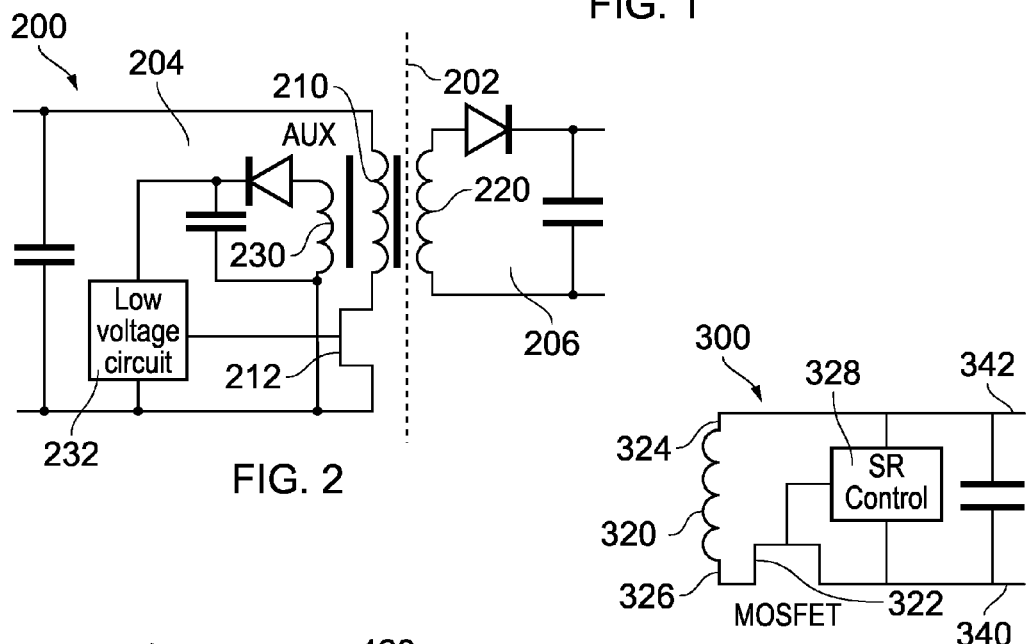
FIG. 2
FIG. 3
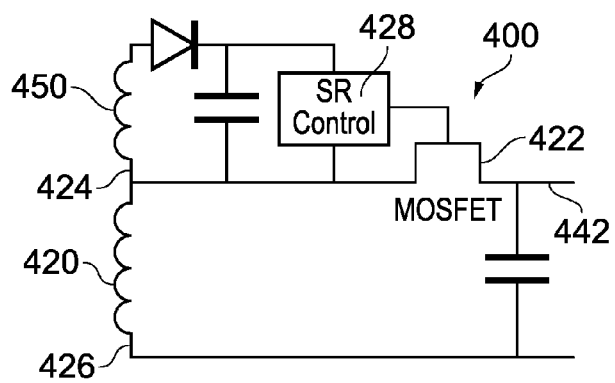
FIG. 4

TRANSFORMER

CROSS-REFERENCE TO RELATED APPLICATIONS

This application claims the priority under 35 U.S.C. §119 of European patent application no. 14198652.1, filed on Dec. 17, 2014, the contents of which are incorporated by reference herein.

The present disclosure relates to apparatus and methods for reducing/minimising common-mode noise from the primary side of a transformer to the secondary side of the transformer.

An electrical transformer may have a primary side and a secondary side configured to transmit electrical power from the primary side to the secondary side. Typically, a transformer will be configured to provide power at a particular frequency or frequency band. Common-mode noise, typically comprising high frequency components, may also be transmitted from the primary side to the secondary side, which is undesirable as it may interfere with equipment being supplied with power by the transformer or with other equipment that is situated near to the transformer. Therefore, transformers may be advantageously configured to reduce or minimize the transmission of common-mode noise between the primary side and the secondary side.

According to a first aspect, there may be provided a transformer, with a primary side and a secondary side, comprising: a main pair of windings, comprising: a primary winding on the primary side; and a secondary winding on the secondary side, configured, in use, to be inductively coupled to the primary winding; a secondary circuit comprising the secondary winding, an output terminal and a secondary-side reference terminal, the output terminal connected to a first end of the secondary winding, the secondary-side reference terminal connected to a second end of the secondary winding; a primary-side auxiliary winding on the primary side, connected at a first end to a primary-side reference terminal, wherein in use the primary-side auxiliary winding may be configured to be inductively coupled to the primary winding such that a first electric potential distribution may be induced in the primary-side auxiliary winding; and a secondary-side auxiliary winding on the secondary side, the secondary-side auxiliary winding having a reference end, wherein the reference end may be connected to a reference terminal in the secondary circuit, wherein, in use, a first portion of the secondary-side auxiliary winding may be configured to be inductively coupled to the primary winding such that a second electric potential distribution may be induced in the secondary-side auxiliary winding; wherein: the primary-side auxiliary winding may be physically located between (a) the main pair of windings; and (b) the second-side auxiliary winding; and a first portion of the secondary-side auxiliary winding may be positioned adjacent to a shield-portion of the primary-side auxiliary winding such that the first electric potential distribution matches the second electric potential distribution: (1) along the respective lengths of the first portion of the secondary-side auxiliary winding and the shield-portion of the primary-side auxiliary winding; and (2) over a frequency range that may be greater than a particular threshold frequency.

The position of the primary-side auxiliary winding may electrically shield the secondary-side auxiliary winding from the primary winding, thereby reducing the common-mode noise between the primary side and the secondary side that exists because of parasitic capacitance.

The matching of the electric potential, above a certain frequency threshold, along the respective lengths of the first portion of the secondary-side auxiliary winding and the shield portion of the primary-side auxiliary winding may reduce the common-mode noise, above the certain frequency, that exists between the primary side and the secondary side as a result of parasitic capacitance.

The primary-side auxiliary winding can provide electric shielding for the secondary-side auxiliary winding because the primary-side auxiliary winding may be a component that is already included in the design of the transformer, in order, for example, to provide power to electrical components on the primary side. Therefore, inclusion of additional components to shield the secondary-side auxiliary winding, and the associated cost and complexity of those components, can be avoided.

The reference terminal in the secondary circuit (to which the reference end of the secondary-side auxiliary winding is connected) may be between the first end of the secondary winding and the output terminal.

The reference terminal in the secondary circuit (to which the reference end of the secondary-side auxiliary winding is connected) may be the output terminal.

The reference terminal in the secondary circuit (to which the reference end of the secondary-side auxiliary winding is connected) may be the first end of the secondary winding.

The reference terminal in the secondary circuit (to which the reference end of the secondary-side auxiliary winding is connected) may be the second end of the secondary winding.

The transformer may further comprise: a switch located in the secondary circuit between the first end of the secondary winding and the output terminal; and a switch controller configured, in use, to receive power from the secondary-side auxiliary winding and to control the switch to provide synchronous rectification.

The primary-side auxiliary winding may further comprise a second end and a midpoint tap, which may be connected to an auxiliary power terminal. The midpoint tap may be connected to the primary-side auxiliary winding between the first end and the second end. A portion of the primary-side auxiliary winding may extend between the midpoint tap and the second end.

The secondary-side auxiliary winding may further comprise a second portion, connected in series to the first portion of the secondary-side auxiliary winding, the first portion physically located between the second portion and the primary-side auxiliary winding.

The shield portion of the primary-side auxiliary winding may be interposed between the first portion of the secondary-side auxiliary winding and the main winding along the respective lengths of the first portion of the secondary-side auxiliary winding and the shield portion of the primary-side auxiliary winding.

A footprint of the shield portion of the primary-side auxiliary winding, in a radial direction with respect to a geometric centre of the main pair of windings, may completely contain the first portion of the secondary-side auxiliary winding along the respective lengths of the shield portion of the primary-side auxiliary winding and the first portion of the secondary-side auxiliary winding.

The first portion of the secondary-side auxiliary winding may be congruent, in a radial direction towards a geometric centre of the main pair of windings, to the shield portion of the primary-side auxiliary winding. The first portion of the secondary-side auxiliary winding may be congruent to the shield portion in respect of area, such that the primary-side auxiliary winding may provide electric shielding to a full width of the secondary-side auxiliary winding. The electric shielding may advantageously reduce the flow of current between the primary side and the secondary side arising by way of parasitic capacitance. The first portion of the secondary-side auxiliary winding may be congruent to the primary-side auxiliary winding in respect of electric potential such that neighbouring parts of the first portion of the secondary-side auxiliary winding and the primary-side auxiliary winding may have substantially similar or the same electric potential. Having the same electric potential will reduce the current that may flow between the primary-side and secondary-side auxiliary windings by way of their parasitic capacitance.

The shield portion of the primary-side auxiliary winding may comprise a multicore electrical conductor.

The transformer may further comprise a shield connected to the primary winding and configured such that: the secondary winding may be positioned between the shield and the primary winding; and in use, a first common-mode noise current may flow between the shield and the secondary winding and a second common-mode noise current may flow between the primary winding and the secondary winding. The connection of the shield may be to a part on the primary side, at a shield potential, selected such that the first common-mode noise current is complementary to the second common-mode noise current.

The particular threshold frequency may be 9 kHz or 150 kHz.

There may be provided an electronic device comprising the transformer, wherein the electronic device may be a switched-mode power supply and/or an integrated circuit.

Examples of the disclosure will now be described in detail with reference to the accompanying figures, in which:

FIG. 1 shows a schematic circuit diagram of an example switched mode power supply;

FIG. 2 shows a more detailed view of part of the schematic circuit diagram of FIG. 1;

FIG. 3 shows a schematic circuit diagram of the secondary side of a flyback converter with a synchronous rectifier controller;

FIG. 4 shows a schematic circuit diagram of the secondary side of a flyback converter with a synchronous rectifier controller in an alternative position;

Figure 5:
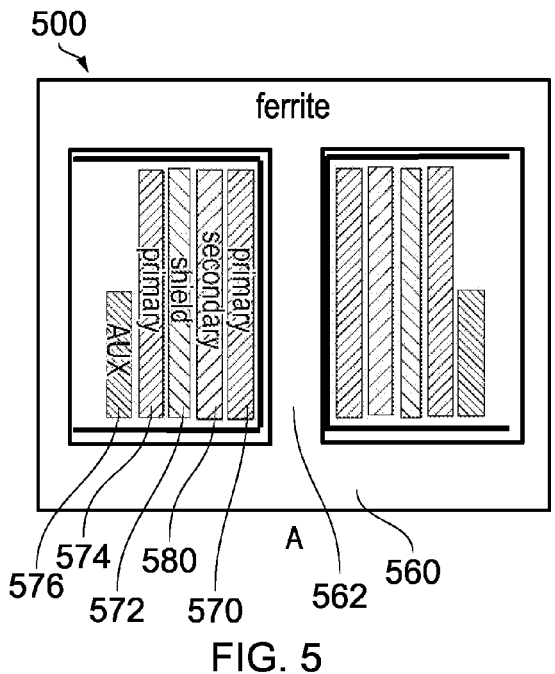
FIG. 5 shows a cross-section view of a transformer.

An electrical transformer may have a primary side and a secondary side, which may be galvanically isolated from one another. The transformer may be supplied with electrical power on the primary side and then supply electrical power to a load connected to the secondary side. Many different geometries of transformer are known and the present disclosure can relate to a broad range of different transformers, some of which may supply power at a higher, lower, or identical, voltage on the secondary side as the voltage supplied to the primary side. One example type of transformer is used in a flyback converter. Flyback converters will be used to illustrate embodiments of the present disclosure, although it will be appreciated that the present disclosure may also relate to other uses of transformers.

FIG. 1 shows a schematic circuit diagram 100 of a flyback converter that includes a transformer. The circuit 100 can be divided by the dotted line 102 into a primary side 104 on the left of the line 102 and a secondary side 106 on the right of the line 102. A primary winding 110 of the transformer is situated on the primary side 104 and a secondary winding 120 of the transformer is situated on the secondary side 106. The primary side 104 comprises a power switch 112, which is some examples may be a transistor such as a Metal Oxide Semiconductor Field Effect Transistor (MOSFET). The secondary side 106 comprises a diode 122 connected to the secondary winding 120. It will be appreciated that the diode 122 may be connected to either end of the secondary winding 120; for example it may be connected to an output/positive voltage end 124 (as shown in FIG. 1) or it may be connected to a reference/ground end of the secondary winding 126.

FIG. 2 shows a more detailed schematic circuit diagram 200 of a flyback converter. Similar components to those shown in FIG. 1 have been given similar reference numerals and will not necessarily be discussed further here. The circuit diagram 200 shows a third winding, which is a primary-side auxiliary winding 230 on the primary side 204. The third winding 230 is configured to receive power by inductive coupling from the primary winding 210, and to supply power to a primary-side control circuit 232, which can be a low voltage circuit. The primary-side control circuit 232 is connected to the power switch 212 on the primary side 204, and is thereby configured to operate the power switch 212. In some examples, where the power switch 212 is a transistor, the primary-side control circuit 232 may be configured to supply a voltage to a gate terminal of the transistor in order to operate the power switch 212.

FIG. 3 shows a schematic circuit diagram 300 for the secondary side of a flyback converter. In this example a SR switch 322 has been used in the circuit, instead of a diode as shown on the secondary side of FIG. 1. The SR switch 322 is controlled such that it provides the functionality of a diode, and may be referred to as a synchronous rectifier. Use of a SR switch 322 may provide for superior energy efficiency because it can have lower losses than a diode. In some examples the SR switch 322 may be a transistor, such as a MOSFET. In order to operate the SR switch 322 the circuit 300 comprises a secondary-side control circuit 328 which requires electrical power in order to operate. In this example, since the secondary side switch 322 is connected between a reference end 326 of the secondary winding 320 and a reference terminal 340 of the flyback converter, the secondary side control circuit 328 can be provided with power by a connection to the output end 324 of the secondary winding 320, which is also the output voltage of the flyback converter. Advantages of placing the secondary-side switch 322 between the reference end 326 of the secondary winding 320 and the reference terminal 340, rather than between the output end 324 of the secondary winding 320 and the output terminal 342, include that no additional windings are required to supply power to the control circuit 328, but disadvantages include that greater noise levels may be generated, which in turn may require the use of larger filters to manage common-mode noise.

FIG. 4 shows a schematic circuit diagram 400 for the secondary side of another flyback converter in which the SR switch 422 has been placed between the output end 424 of the secondary winding 420 and the output terminal 442 of the flyback converter. A secondary side control circuit 428 is included in order to operate the SR switch 422. The secondary side control circuit 428 therefore needs to be provided with a supply of power when the flyback converter is in use. This power supply is provided by adding an additional winding 450 to the transformer, connected between the output end 424 of the secondary winding 420 and a supply voltage terminal of the secondary side control circuit 428. This additional winding 450 may be referred to as a secondary side auxiliary winding. The secondary side control circuit 428 also has a reference terminal that is connected to the output side 424 of the secondary winding 420 in order to complete the circuit.

In the transformers disclosed above, and in transformers generally, a significant problem is common-mode noise transmission from the primary side to the secondary side. Common-mode noise is a type of Electromagnetic Interference (EMI) that typically occurs at high frequencies and may be problematic for any device being supplied with electrical power from a transformer. Common-mode noise may exist because of a coupling between a winding on the primary side and a winding on the secondary side as parasitic capacitance exists between adjacent windings.

FIG. 5 shows a cross-section view of a transformer 500 comprising windings wound around a ferrite core 560. It will be appreciated that many other core materials may be used, including air, and that the core may comprise a single loop of core material (not shown) or a double loop, or so-called 'shell-form' core, as shown. In this example, a first portion 570 of the primary winding is wound around a central section of the core, which may also be referred to as the centre leg 562. The cross section of the first portion 570 of the primary winding does not show individual turns in order to improve the clarity of the disclosure, although it will be appreciated that in some examples the first portion 570 of the primary winding may comprise a plurality of turns or a single turn. A secondary winding 580 is then wound around the first portion 570 of the primary winding. A shield 572 is then wrapped around the secondary winding 580. In some examples, the shield 572 may comprise a solid sheet of conducting material, such as copper or brass, which is therefore configured to have a single electric potential throughout its extent. A second portion 574 of the primary winding is then wound around the shield 572. The second portion 574 of the primary winding may be connected in series to the first portion 570 of the primary winding in order to increase the ratio of turns between the primary winding 570, 574 and the secondary winding 580. A primary-side auxiliary winding 576 is wound around the second portion 574 of the primary winding. In this example, the primary-side auxiliary winding 576 extends across only part of the width of the centre leg 562. However, it will be appreciated that the primary-side auxiliary winding may extend across the full width (not shown) of the centre leg. If a potential difference exists between adjacent parts of adjacent windings, between for example part of the first portion 570 of the primary winding and an adjacent part of the secondary winding 580, then current may flow between the adjacent parts by way of parasitic capacitance.

Figure 6:
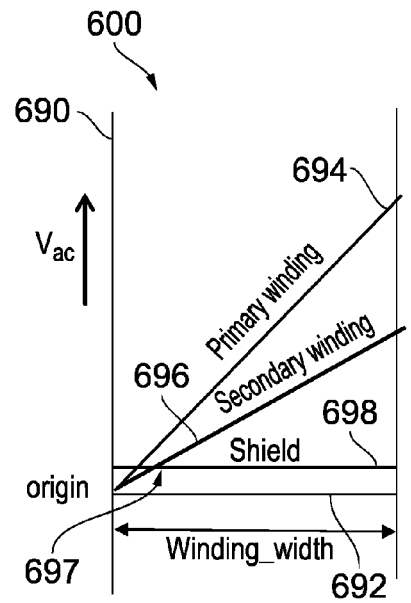
FIG. 6 shows a graph depicting the electric potential of different windings in the transformer of FIG. 5 at a particular point in time during operation of the transformer.

FIG. 6 provides a schematic diagram 600 of the electric potential of the first portion of the primary winding, the secondary winding and the shield shown in FIG. 5. The electric potential of the second portion of the primary winding and primary-side auxiliary winding are not shown in FIG. 6 because FIG. 6 is used to illustrate current that flows into the secondary winding from adjacent conductors on the core.

Electric potential is shown on a vertical axis 690 and position across the width of the central section of the core is shown on a horizontal axis 692. (The width of the central section of the core extends in a vertical direction, as it is shown in FIG. 5). A first straight line 694 shows the potential of the first part of the primary winding for a cross-section through the core. A more detailed illustration would not show a straight line, but rather a 'staircase' shaped set of lines, as the potential of a first turn would be constant across its cross section, then the potential of the cross section of the next turn would also be constant, but at a higher value as the electric potential induced by inductive coupling would be higher in that next turn. The 'staircase' would continue across the width of the central section as each turn develops a progressively higher potential. However, in order to improve the clarity of the disclosure, a single line is shown as an approximation.

Similarly, the potential of the cross section of the secondary winding is shown as a second straight line 696. Here, the primary winding possesses a greater number of turns than the secondary winding and therefore the gradient of the second line 698 is shallower than that of the first line 694. A third line 698 shows the electric potential of the shield, which, since the shield is a single conductive sheet of material, is constant across the full width of the central section of the core. In order to provide for a particular potential across the shield, the shield is connected to the primary side at a particular point. By choosing the point of connection, the value of the constant shield potential can be chosen to have an appropriate value to reduce or avoid common-mode noise.

Since the first portion of the primary winding is located adjacent to the secondary winding, the potential difference between respective adjacent parts of the windings will enable a current to flow between the respective parts because of the parasitic capacitance of the respective parts with respect to one another. Current may thereby flow between adjacent windings along the respective lengths of the windings, where the respective lengths refers to adjacent parts of the windings as the windings wind around the core.

The current flowing via parasitic capacitance from the first portion of the primary winding to the secondary winding will consist of the sum of all currents flowing between the respective adjacent parts of the primary and secondary windings. This current will therefore be proportional to the integral of the potential difference between the primary and secondary windings along the length of the secondary winding. This integral will be proportional to the area between the first 694 and second 696 lines of FIG. 6.

Similarly, since the shield is adjacent to the secondary winding, a current will flow between respective adjacent parts of the shield and the secondary winding, when there is a potential difference between the respective adjacent parts. As can be seen from FIG. 6, the third line 698 crosses the second line 696 at a certain point 697, where the potential of the shield coincides with the potential of the secondary winding. The current flowing between the shield and the secondary winding will therefore flow in different directions on either side of this point. The total current flowing from the shield to the secondary winding due to capacitance will be proportional to the area between the second 696 and third lines 698 (both positive and negative) for the same reasons as discussed above in relation to the first 694 and second 696 lines.

As the potential of the primary winding is greater than that of the secondary winding, at all points except at the beginning of the windings where the potentials are the same, the current will all flow from the primary winding to the secondary winding, thereby flowing from the primary side of the transformer to the secondary side of the transformer. However, most of the current between the secondary winding and the shield will flow from the secondary winding to the shield as the secondary winding is at a higher potential than the shield along most of its length. Of course, some current will flow from the shield to the secondary winding where the shield has a higher potential. If the shield potential is appropriately selected, then the current flowing between the primary winding and the secondary winding can be made to match the current flowing between the secondary winding and the shield. Then the total current flowing between the primary winding and the secondary winding will be of equal magnitude but opposite sign to the total current flowing between the secondary winding and the shield. Therefore, advantageously, the total current flowing between the primary side and the secondary side of the transformer will match and thereby cancel out. Of course, while a small mismatch between the currents flowing between the different parts of the transformer will result in a small amount of common-mode noise between the primary and secondary sides, an advantage will still be provided by reducing the common-mode noise to this small amount, by using this cancellation technique.

Figure 7:
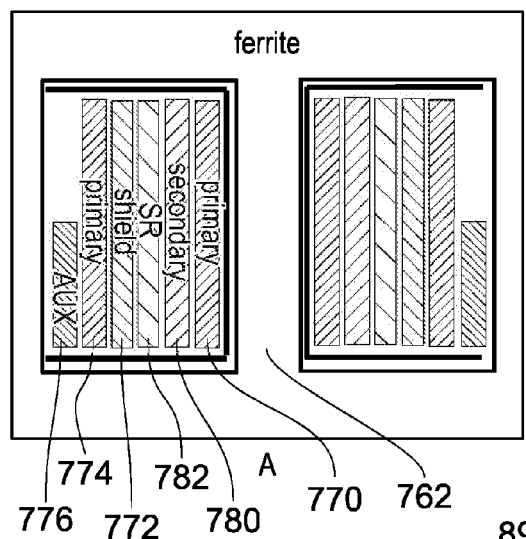
FIG. 7 shows a cross-section view of a transformer with a secondary-side auxiliary winding.

FIG. 7 shows a cross-section view of a transformer 700, similar to the transformer of FIG. 5, but further including a secondary-side auxiliary winding 782, physically located between a secondary winding 782 and a shield 772. The secondary-side auxiliary winding 782 extends across the full width of the centre leg 762 of the transformer 700. In this transformer 700, common-mode noise will exist between the primary side and the secondary side due to the parasitic capacitance between: (i), the first portion of the primary winding 770 and the secondary winding 780; and (ii), the shield 772 and the secondary-side auxiliary winding 782.

Figure 8:
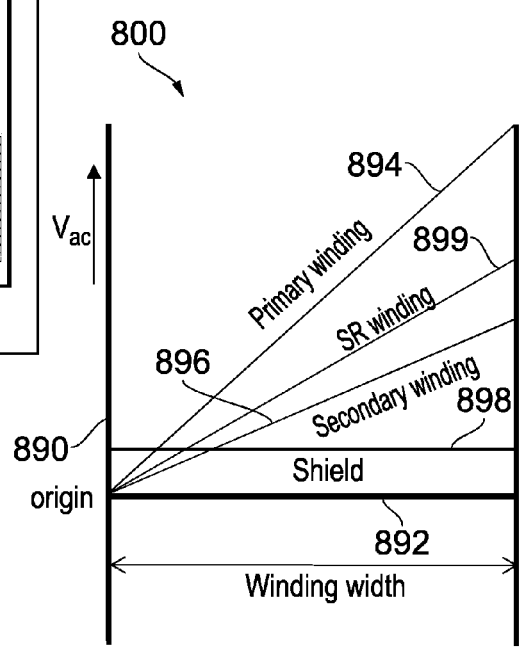
FIG. 8 shows a graph depicting the electric potential of different windings in the transformer of FIG. 7.

FIG. 8 shows a chart 800 of the electric potential in some of the windings of the transformer of FIG. 7 in a way similar to the illustration of the electric potentials in FIG. 6. The potential of the first portion of the primary winding increases linearly across the width of the winding, as shown by a first straight line 894. A second straight line 896 shows the potential of the secondary winding across the width of the winding. For the same reasons as disclosed above in relation to FIG. 6, the current that will flow between the primary winding 870 and the secondary winding 880 as a result of parasitic capacitance is proportional to the area between the first 894 and second lines 896. A third straight line 899 shows the potential of the secondary-side auxiliary winding across the width of the winding, while a fourth straight line 898 shows the potential of the shield. The shield has a constant potential throughout the full extent of its cross section, which is provided for by connecting the shield to an appropriate part of the primary side. In some examples the shield may be connected to the primary side reference terminal which may be connected to electrical ground. As disclosed above, the current that will flow between the shield and the adjacent winding, here the secondary-side auxiliary winding, will be proportional to the areas between the third 699 and fourth 698 lines. When the electric potential of the shield is appropriately chosen, the total current flowing from the primary winding to the secondary winding will be of equal magnitude but opposite sign to the total current flowing from the shield to the secondary-side auxiliary winding. Thus the current flowing from the primary side of the transformer to the secondary side of the transformer will, advantageously, cancel out.

It will be appreciated that various arrangements of primary and secondary winding and one or more shields may be used to reduce the transmission of common-mode noise from the primary side to the secondary side of a transformer. This reduction will generally be achieved by arranging for a first common-mode noise current to flow from a component on the primary side to a component on the secondary side and also for a second common-mode noise current to flow from a component on the primary side to a component on the secondary side, such that the first common-mode noise current will be complementary to the second common-mode noise current and they will cancel each other out.

A problem with the fabrication of the transformer of FIG. 7 is the difficulty of winding the secondary-side auxiliary winding 782 across the full width of the centre leg 762. This is particularly the case where a circuit on the secondary side (such as a SR control circuit) that is configured to receive power from the secondary-side auxiliary winding 782 requires a voltage provided by a smaller number of turns than the number of turns in the secondary winding 780. If the number of turns in the secondary-side auxiliary winding 782 is smaller than the number of turns in the secondary winding 780, and if the thickness of the wire used to make the windings is the same, then the secondary-side auxiliary winding 782 will cover a smaller area of the centre leg 762 than the secondary winding 780. This may cause problems for windings that are wound around the secondary-side auxiliary winding 782 if those other windings cover a greater area of the centre leg 762 than the secondary-side auxiliary winding 782 since the portion of those other windings that extend beyond the area covered by the secondary-side auxiliary winding 782 will not be physically supported by the secondary-side auxiliary winding 782. If the secondary-side auxiliary winding 782 is a different width than the secondary winding 780, as a consequence of having a different number of turns or as a consequence of being comprised of thinner wire, then it can be difficult to successfully cancel out the common-mode noise current.

Figure 9:
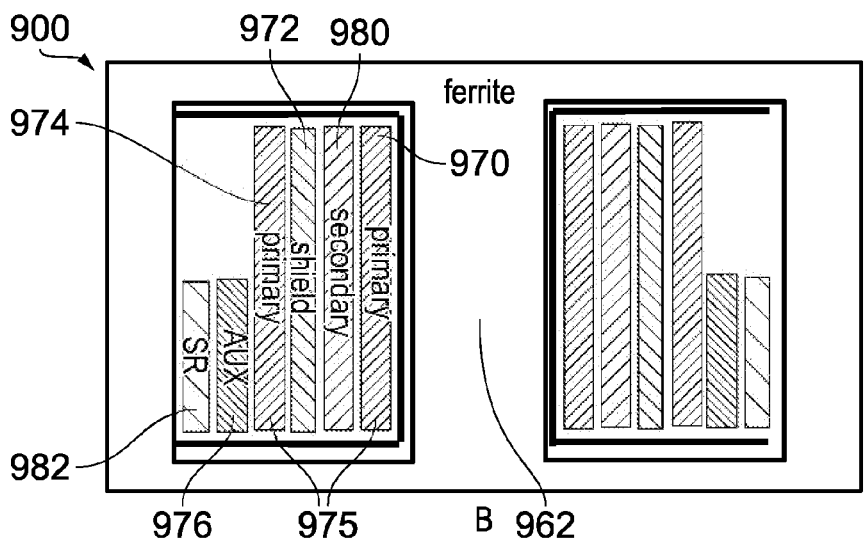
FIG. 9 shows a cross-section view of a transformer with a secondary-side auxiliary winding located in an alternative position.
Figure 10:
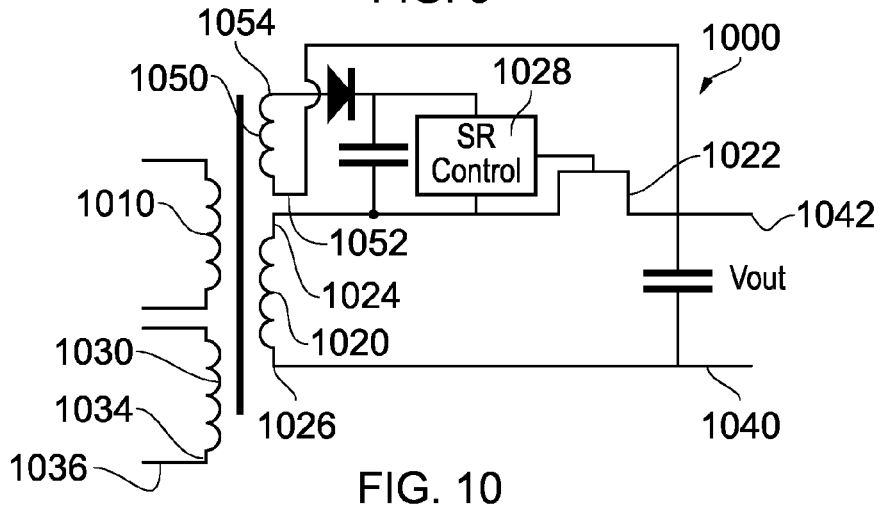
FIG. 10 shows a schematic circuit diagram of a first embodiment of the transformer of FIG. 9.
Figure 12:
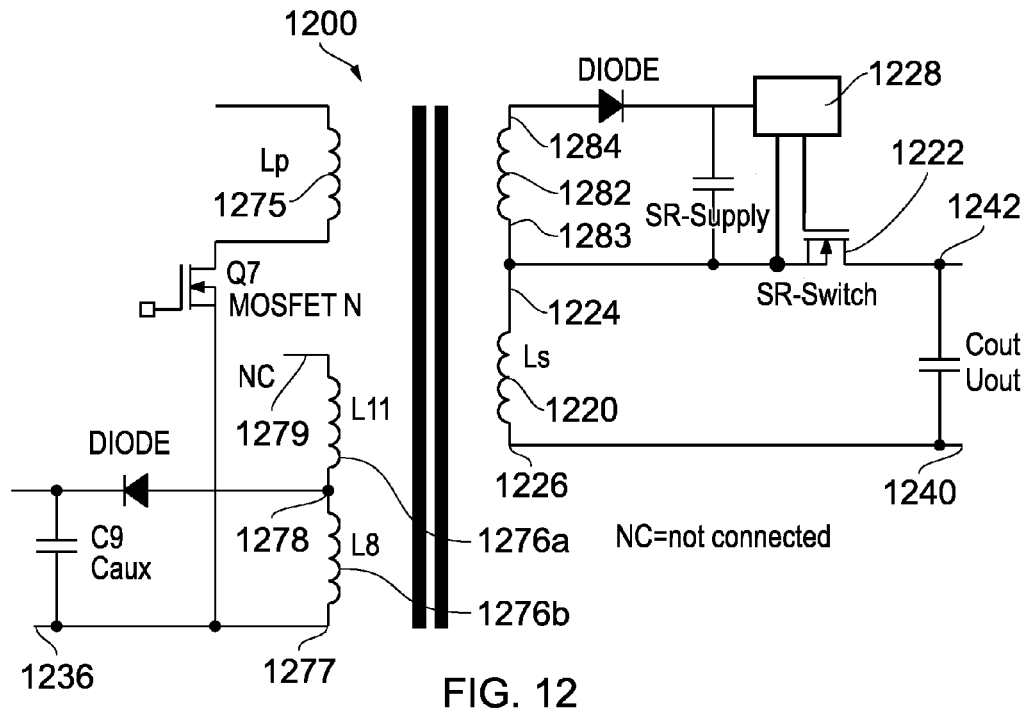
FIG. 12 shows a schematic circuit diagram of a second embodiment of the transformer of FIG. 9.
Figure 14:
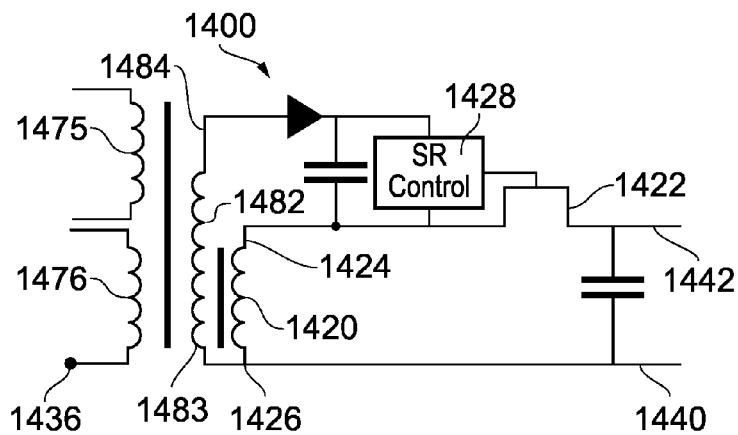
FIG. 14 shows a schematic circuit diagram of a third embodiment of the transformer of FIG. 9.

FIG. 9 shows a cross-section view of a transformer 900, with a primary side and a secondary side, comprising a main pair of windings. The main pair of windings comprises a primary winding 975 on the primary side and a secondary winding 980 on the secondary side. The secondary winding 980 is configured, in use, to be inductively coupled to the primary winding 975. The secondary winding 980 is part of a secondary circuit, embodiments of which are illustrated in FIGS. 10, 12 and 14 as discussed below.

The transformer 900 further comprises a primary-side auxiliary winding 976 on the primary side. In use, the primary-side auxiliary winding 976 is configured to be inductively coupled to the primary winding 975 such that a first electric potential distribution is induced in the primary-side auxiliary winding 976 as a consequence of the voltage across the primary winding 975. The first electric potential induced in the primary-side auxiliary winding 976 can be used to power a controller on the primary side of a circuit associated with the transformer.

The transformer further comprises a secondary-side auxiliary winding 982 on the secondary side. In use, the secondary-side auxiliary winding 982 is configured to be inductively coupled to the primary winding 975 such that a second electric potential distribution is induced in the secondary-side auxiliary winding 982. The second electric potential induced in the secondary-side auxiliary winding 982 can be used to power a controller on the secondary side of a circuit associated with the transformer. A reference end of the secondary-side auxiliary winding 982 may be connected to the secondary circuit at various different points, as discussed below in relation to FIGS. 10, 12 and 14.

As shown in FIG. 9, the primary-side auxiliary winding 976 is physically located between: (1) the main pair of windings; and (2) the second-side auxiliary winding 982. In particular, the primary-side auxiliary winding 976 is physically located between the secondary-side auxiliary winding 982 and the primary winding 975. It will be appreciated that other arrangements of the primary winding, secondary winding and one or more shields are possible and may provide for effective common-mode noise cancellation between the various components of the main pair of windings and any such shields. By positioning the primary-side auxiliary winding 976 between the secondary-side auxiliary winding 982 and the main pair of windings 975, 980, the primary-side auxiliary winding 976 can act as an electrostatic shield, that shields the secondary-side auxiliary winding 982 from receiving common-mode noise currents from any part of the main pair of windings or any associated shields.

The secondary-side auxiliary winding 982 is positioned adjacent to the primary-side auxiliary winding 976 such that a first portion of the secondary-side auxiliary winding 982 overlaps with a shield portion of the primary-side auxiliary winding 976. In this way the first electric potential distribution along a length of the shield-portion of the primary-side auxiliary winding 976 matches the second electric potential distribution along the length of the adjacent first portion of the secondary-side auxiliary winding 982.

In this example, the first portion of the secondary-side auxiliary winding 982 is the entire secondary-side auxiliary winding 982, and the shield portion of the primary-side auxiliary winding 976 is the entire primary-side auxiliary winding 976. Also in this example, the secondary-side auxiliary winding 982 extends to the same length as the primary-side auxiliary winding 976, although in other examples the secondary-side auxiliary winding 982 may be shorter than the primary-side auxiliary winding 976, in which case only the part of the primary-side auxiliary winding 976 that is adjacent to the secondary-side auxiliary winding 982 will comprise the shield portion. Also, the primary-side auxiliary winding 976 may further comprise an additional portion or portions that extend beyond the shield portion of the primary-side auxiliary winding 976 at either end of the shield portion or at both ends.

The first electric potential distribution along the length of the shield-portion of the primary-side auxiliary winding 976 matches the second electric potential distribution along the length of the first portion of the secondary-side auxiliary winding 982. That is, at locations along the length of the first portion of the secondary-side auxiliary winding the electric potential has the same value as the electric potential at corresponding locations along the length of the shield-portion of the primary-side auxiliary. As will be described in more detail below, such matching may involve ensuring that the electric potential of the two windings matched up at the point where they start overlapping. Here, corresponding locations means locations on the respective windings that are physically sufficiently next to one another in order to achieve an acceptable matching between the potential distributions of the respective windings.

The electric potential distribution matching along the length of the shield-portion of the primary-side auxiliary winding 976 and the first portion of the secondary-side auxiliary winding 982 can occur at least over a frequency range that is greater than a particular threshold frequency. The electrical potential distribution can be said to be matched if the difference is less than a matching threshold value. The electric potential distribution of the windings may not match at frequencies less than the particular threshold frequency. It will be appreciated that the particular threshold frequency value will be determined by the geometry of the respective windings, and their orientation with respect to one another.

Common-mode noise typically exists above a certain threshold frequency, therefore techniques to reduce or minimize common-mode noise need only be concerned with the frequency components of electric potential above that certain threshold frequency. Reduction in common-mode noise coupling may also be required in order to comply with certain standards and regulations. In some examples, such standards and regulations relate to common-mode noise with frequencies above 150 kHz. Of course, other thresholds, either at a higher or a lower frequency may be used in order to provide advantageous reductions in common-mode noise. For example, in equipment relating to lighting systems a threshold of 9 kHz may be appropriate. When nearby parts of the first portion of the secondary-side auxiliary winding and the shield-portion of the primary-side auxiliary winding have the same electric potential there can be zero potential difference between the respective parts. With zero potential difference no current will flow via the parasitic capacitance between the secondary-side auxiliary winding and the primary-side auxiliary winding. Thereby, common-mode noise between the primary side and the secondary side of the transformer 900 can be advantageously avoided or reduced.

While it is desirable for the electric potential distributions of adjacent parts of the secondary-side auxiliary winding and the primary-side auxiliary winding to match both along their respective lengths and above a particular frequency threshold, it is not necessary for the electric potential to match at all frequencies. Indeed, at lower frequencies, below the particular frequency threshold, the respective windings may have very different electric potentials. However, as is well-known to persons skilled in the art, parasitic capacitances can often be ignored at low frequencies because the corresponding currents may be considered negligible at such frequencies.

FIG. 10 shows an example schematic circuit diagram for a flyback converter 1000 that can use the transformer of FIG. 9. The circuit diagram shows components that are similar to the components disclosed above in relation to the flyback converter circuit illustrated in FIG. 4, although in this example the secondary-side auxiliary winding 1050 is connected with reference to the output terminal 1042 of the flyback converter 1000. As will be discussed in more detail below, connecting the secondary-side auxiliary winding 1050 in this way enables the potential distribution along the secondary-side auxiliary winding 1050 to be matched with the potential distribution along the primary-side auxiliary winding 1030.

In FIG. 10, the flyback converter 1000 has a primary winding 1010 and a primary-side auxiliary winding 1030 on the primary side of the flyback converter 1000. The primary-side auxiliary winding 1030 has a first end 1034 which is connected to a primary-side reference terminal 1036, which in some examples may be electrical ground. The first end of the primary-side auxiliary winding 1030 may be referred to as a reference terminal 1034.

A secondary winding 1020 is located on the secondary side of the flyback converter 1000. The secondary winding 1020 forms part of a secondary circuit in which an output terminal 1042 is connected to a first end 1024 of the secondary winding 1020 via the SR switch 1022, while a second end 1026 of the secondary winding 1020 is connected to a secondary-side reference terminal 1040, which in some examples may be electrical ground. The second end 1026 of the secondary winding 1020 may referred to as a reference end.

The secondary circuit further comprises an SR (synchronous rectification) switch 1022 located between the output terminal 1042 and the first end 1024 of the secondary winding 1020. Similar to the switch shown in FIG. 4, the SR switch 1022 may be configured to provide the functionality of a diode, and thereby to provide synchronous rectification at the output of the flyback converter 1000. As discussed above in relation to FIG. 4, an SR switch controller 1028 provides a control signal to the SR switch 1022. A secondary-side auxiliary winding 1050, located on the secondary side of the flyback converter 1000, is used to provide a power supply to the SR switch controller 1028.

The secondary-side auxiliary winding 1050 has a first end, which will be referred to as a reference end 1052. The secondary-side auxiliary winding 1050 also has a second end 1054, which is connected to a supply voltage terminal of the SR switch controller 1028. A reference terminal of the SR switch controller 1028 is further connected to the secondary circuit at the first end 1024 of the secondary winding 1020.

In this example, the reference end 1052 of the secondary-side auxiliary winding 1050 is connected to the secondary circuit at the output terminal 1042. The electric potential provided to the SR switch controller 1028 by the secondary-side auxiliary winding 1050 is therefore provided with reference to the output voltage at the output terminal 1042. The output terminal can be considered to have a sufficiently constant voltage for it to be an acceptable reference terminal for the secondary-side auxiliary winding 1050. An advantage of connecting the reference end 1052 of the secondary-side auxiliary winding 1050 in this way is that the secondary-side auxiliary winding 1050 will typically only require a relatively small number of turns, in order to supply adequate power to the SR switch controller 1028, compared to the number of turns that would be required if the reference end 1052 was connected to the secondary-side reference terminal 1040, as shown in FIG. 14.

Since the reference end 1052 of the secondary-side auxiliary winding 1050 is connected to the output terminal 1042, its electric potential can be considered as approximately constant. Also, as indicated above, the reference end 1034 of the primary-side auxiliary winding 1030, is connected to reference terminal such as ground that has an approximately constant reference voltage. Therefore, as discussed above with reference to FIG. 9, the potential distribution along the secondary-side auxiliary winding 1050 can be matched with that of the primary-side auxiliary winding 1030 for high frequency signals, such as those that would otherwise generate problematic common-mode noise. More particularly, since the reference ends 1052, 1034 of the secondary-side auxiliary winding 1050 and the primary-side auxiliary winding 1030 are at the same constant potential, the location of the starting point of the secondary-side auxiliary winding 1050 along the transformer centre leg can correspond with the location of the starting point of the primary-side auxiliary winding 1030 along the transformer centre leg, as shown in FIG. 9.

Figure 11:
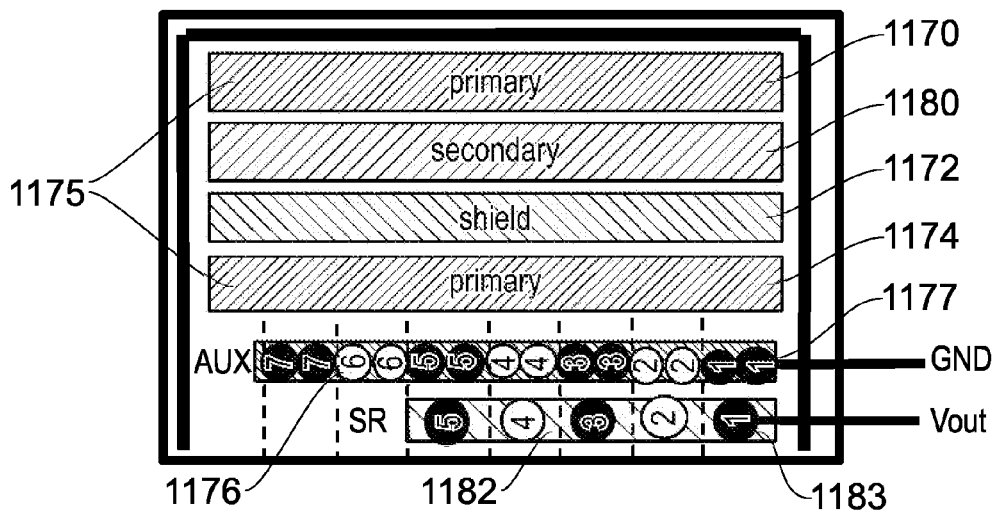
FIG. 11 shows a cross-section view of part of the transformer of FIG. 10.

FIG. 11 shows a cross-section 1100 of the windings of another transformer that can be used in the circuit of FIG. 10. In this example, the primary-side auxiliary winding 1176 is required to provide a relatively greater output voltage than the secondary-side auxiliary winding 1182, and therefore the primary-side auxiliary winding 1176 has more turns than the secondary-side auxiliary winding 1182 and is consequently wider. Only half of the cross-section of the transformer is shown in FIG. 11, which corresponds to the left hand side of FIG. 9, rotated through ninety degrees.

As described above with reference to FIG. 10, because the reference end 1177 of the primary-side auxiliary winding 1176 is connected to a primary-side reference terminal such as ground, it will have a constant electric potential. Similarly, the reference end 1183 of the secondary-side auxiliary winding 1182 has a constant electric potential because it is connected to the output terminal of the flyback converter (Vout). Therefore, by positioning the first end 1177 of the primary-side auxiliary winding 1176 adjacent to the first end 1183 of the secondary-side auxiliary winding 1182, the high frequency electric potentials of these adjacent parts of the two windings are matched to one another.

In the example of FIG. 11, the primary-side auxiliary winding 1176 comprises seven turns, wherein each turn comprises a pair of conducting wire cores. The secondary-side auxiliary winding 1182 comprises five turns of single core conducting wire. It is therefore possible to wind the secondary-side auxiliary winding 1182 around the primary-side auxiliary winding 1176 such that the potential in both windings increases in tandem as a consequence of the inductive coupling between both windings and the primary winding 1175. In this way, the potential of each part of the secondary-side auxiliary winding 1182 and the closest part of the primary-side auxiliary winding 1176 to each part of the secondary-side auxiliary winding 1182 are the same. Since, along the entire length of the secondary-side auxiliary winding 1182 there is no potential difference with respect to the closest corresponding parts of the primary-side auxiliary winding 1176, the common-mode noise current flowing between the primary-side auxiliary winding 1176 and the secondary-side auxiliary winding 1182 may be reduced or minimized.

In FIG. 11, the first 5 turns of the primary-side auxiliary winding 1176 can be considered as shield-portion. The entire secondary-side auxiliary winding 1182 can be considered as the first portion, which is overlapped by the shield portion such that it does not receive significant common-mode noise signals from the primary side of the transformer.

FIG. 12 shows a schematic circuit diagram 1200 for a flyback converter comprising many components that are similar to the components of the flyback converter of FIG. 10. Components and features that have already been described with reference to an earlier figure will not necessarily be described again here.

The circuit diagram 1200 of FIG. 12 comprises a secondary-side auxiliary winding 1282 with a reference end 1283 and a second end 1284. In this example, the SR switch controller 1228 has a reference terminal that is connected to the secondary circuit at the first end 1224 of the secondary winding 1220. In the circuit of FIG. 12, the reference end 1283 of the secondary-side auxiliary winding 1282 is connected to the first end 1224 of the secondary winding 1220.

The reference end 1283 of the secondary-side auxiliary winding 1282 is connected to the first end 1224 of the secondary winding 1220, which will not have a substantially constant potential. Nonetheless, the secondary-side auxiliary winding 1282 can still be matched to the primary-side auxiliary winding 1276 if the potential at a starting point of a shield portion 1276a of the primary-side auxiliary winding 1276, can have a similar non-constant potential. In this example, the electric potential of the secondary-side auxiliary winding 1282 is matched to that of the shield portion 1276a of the primary-side auxiliary winding 1276 by locating the beginning of the secondary-side auxiliary winding 1282 some distance away from the beginning of the primary-side auxiliary winding 1276. In other words, the primary-side auxiliary winding 1276 can be provided as at least two sub-windings in series with each other. A reference terminal 1277 of a first sub-winding 1276b can be directly connected to the primary side reference terminal 1236. A second end 1278 of the first sub-winding 1276b can be used to provide a voltage supply to a primary side controller (not shown). A first end of a second sub-winding 1276a is connected to the second end 1278 of the first sub-winding 1276b. A second end 1279 of the second sub-winding 1276a can be left unconnected. All or a subset of the second sub-winding 1276a can be used as the shield portion, as will be discussed in more detail with reference to FIG. 13.

The connection 1278 between the first sub-winding 1276b and the second sub-winding 1276a can be considered as a centre tap 1278 to an appropriate part of the primary-side auxiliary winding 1276 for providing power to a component on the primary side at an appropriate voltage level.

Figure 13:
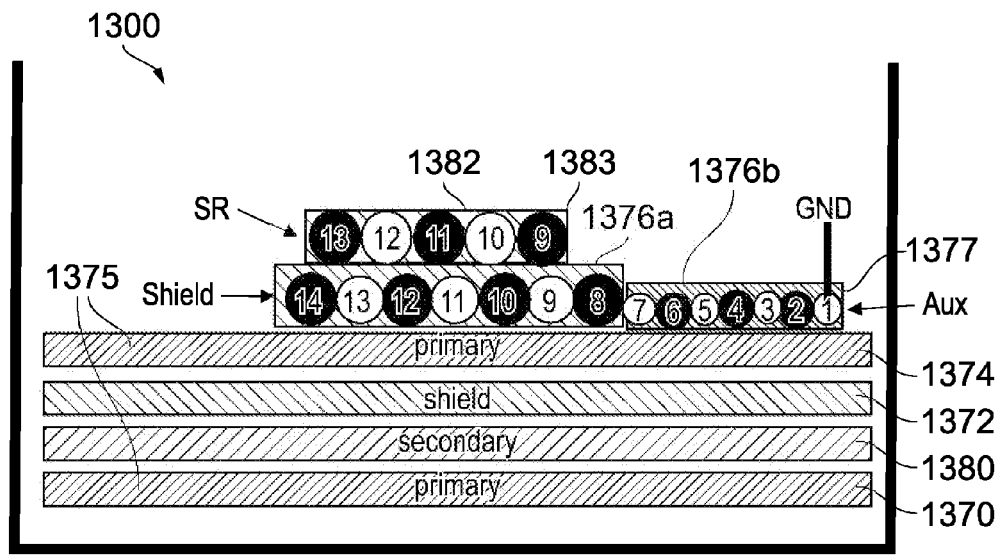
FIG. 13 shows a cross-section view of part of the transformer of FIG. 12.

FIG. 13 shows a cross section view 1300 of a portion of the turns in the transformer of FIG. 12. The primary-side auxiliary winding 1376 is wound around part of the primary winding 1374. In this example, the primary-side auxiliary winding 1376 comprises fourteen turns. The secondary winding 1380 comprises eight turns (not shown). Since the reference end 1383 of the secondary-side auxiliary winding 1382 is connected to the first end of the secondary winding 1380, the potential at the reference end 1383 of the secondary-side auxiliary winding 1382 will be the same as that of a node between the eighth and the ninth turn of the primary-side auxiliary winding 1376. Therefore, the first turn of the secondary-side auxiliary winding 1382 is positioned on top of (adjacent to) the ninth turn of the primary-side auxiliary winding 1376. That is, the shield portion of the primary-side auxiliary winding 1376 starts at turn number nine. Subsequent turns of the secondary-side auxiliary winding 1382 are positioned on top of corresponding turns of the primary-side auxiliary winding 1376. In this way a matching potential is provided such that the potential difference, and hence the common-mode noise current, between the primary-side auxiliary winding 1376 and the secondary-side auxiliary winding 1382 is reduced or minimized.

It can be seen from FIG. 13 that the turns of the secondary-side auxiliary winding 1382 are not positioned exactly above the turns of the primary-side auxiliary winding 1376. This arrangement can, therefore, enable a small amount of common-mode noise to be transmitted from the primary side to the secondary side, however the amount of such noise may be sufficiently small as to be negligible and thus the arrangement of FIG. 13 may still provide advantageous performance.

FIG. 14 shows a schematic circuit diagram 1400 for a flyback converter comprising many components that are similar to the components of the flyback converter of FIG. 12. Components and features that have already been described with reference to an earlier figure will not necessarily be described again here.

In FIG. 14, the reference end 1483 of the secondary-side auxiliary winding 1482 is connected to the secondary circuit at the secondary-side reference terminal 1440, which may be ground. Also, the reference end of the primary-side auxiliary winding 1476 is connected to a primary-side reference terminal 1436, which may also be ground. Therefore, the reference end 1483 of the secondary-side auxiliary winding 1482 may advantageously be positioned on top of (adjacent to) the reference end of the primary-side auxiliary winding 1476, as their respective electric potentials will match. Therefore, the primary-side auxiliary winding 1476 may not require additional turns in order to provide a starting point for matching with the secondary-side auxiliary winding 1482 that is mid-way/part-way along the primary-side auxiliary winding 1476 (such a mid-way point can be seen in FIGS. 12 and 13).

The SR controller 1428 in FIG. 14 has a reference terminal that is connected to the first end 1424 of the secondary winding 1420. Therefore, since the secondary-side auxiliary winding 1482 is referenced to secondary-side reference terminal 1440, which may be ground, the secondary-side auxiliary winding 1482 should provide the SR controller 1428 with a voltage that is greater than that at the first end 1424 of the secondary winding 1420 in order for there to be a potential difference across the SR controller 1428. As shown in FIG. 14, this means that the secondary-side auxiliary winding 1482 should have more turns than the secondary winding 1420.

Figure 15:
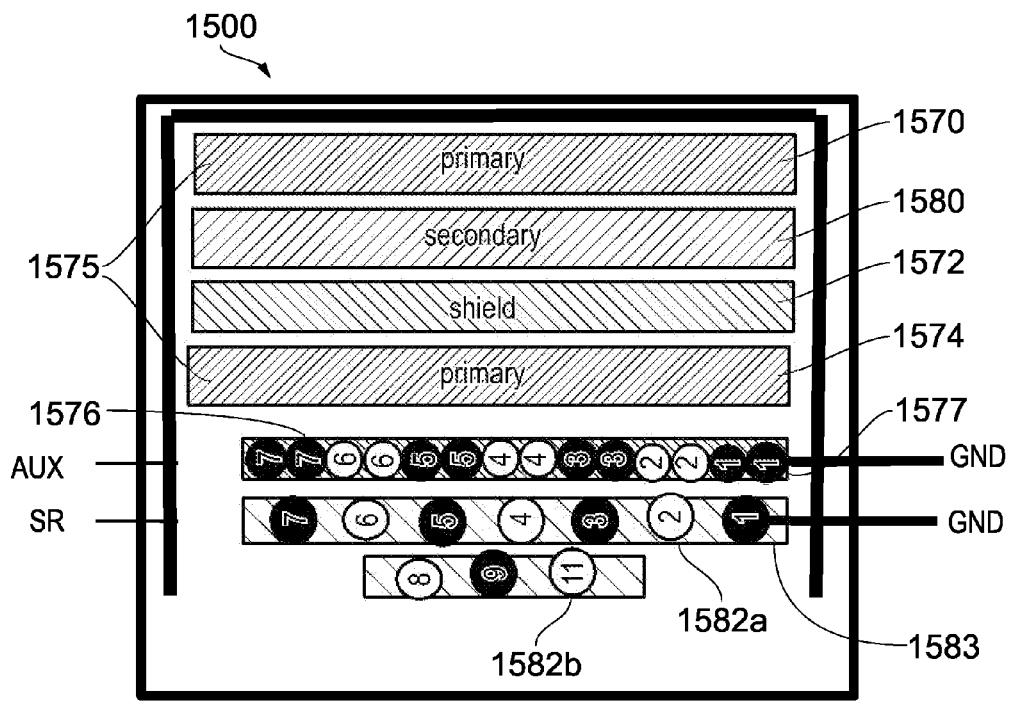
FIG. 15 shows a cross-section view of part of the transformer of FIG. 14.

FIG. 15 shows a cross-section view of part of the windings of the transformer of FIG. 14. As in the example of FIG. 11, the reference end 1577 of the primary-side auxiliary winding 1576 is positioned adjacent to the reference end 1583 of the secondary-side auxiliary winding 1582, because both reference ends 1577, 1583 have a constant potential. Subsequent windings of the secondary-side auxiliary winding 1582 are wound around corresponding windings of the primary-side auxiliary winding 1576 with matching potentials.

In this example, the secondary-side auxiliary winding 1582 has more windings than the primary-side auxiliary winding 1576. More particularly, the primary-side auxiliary winding 1576 comprises seven turns, whereas the secondary-side auxiliary winding 1582 comprises eleven turns. The secondary-side auxiliary winding 1582 can be considered as having a first portion 1582*a* that is for matching with the primary-side auxiliary winding 1576, in the same way as described above.

The secondary-side auxiliary winding 1582 also has a second portion 1582*b* that is connected in series with the first portion 1582*a*. The first portion 1582*a* and the second portion 1582*b* together provide the necessary voltage for the SR controller.

The first portion 1582*a* of the secondary-side auxiliary winding 1582 is physically located between the second portion 1582*b* and the primary-side auxiliary winding 1576. That is, the second portion 1582*b* of the secondary-side auxiliary winding 1582 is located outside of the first portion 1582*a* of the secondary-side auxiliary winding 1582, and does not substantially extend beyond the ends of the first portion 1582*a*. In this way, the second portion 1582*b* is not adjacent to a winding on the primary side and therefore is not susceptible to receiving common-mode noise from the primary side of the transformer. In other words, the first portion 1582*a* of the secondary-side auxiliary winding 1582 provides electric shielding for the second portion 1582*b* of the secondary-side auxiliary winding 1582 from the primary-side auxiliary winding 1576 and the primary winding 1575.

It will be appreciated that the secondary-side auxiliary winding may comprise a plurality of portions, a first portion wound around the primary-side auxiliary winding and each subsequent portion wound around a preceding portion of the secondary-side auxiliary winding.

In this example, the entire primary-side auxiliary winding 1576 can be considered as a shield portion, and a subset/sub-winding of the secondary-side auxiliary winding 1582 can be considered as a first portion that is for matching with the shield portion.

Figure 16:
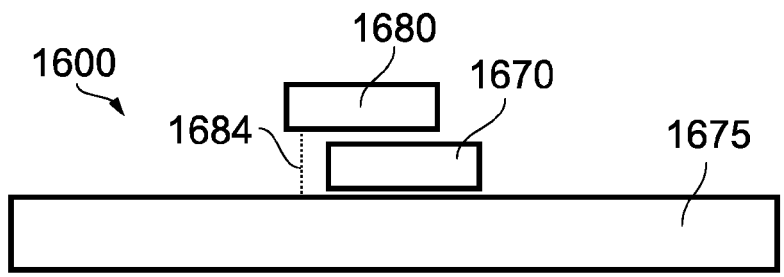
FIG. 16 shows a cross-section view of part of a transformer with a turn of a primary-side auxiliary winding between a turn of a secondary-side auxiliary winding and a primary winding.

FIG. 16 shows a schematic diagram 1600 of a cross-section through part of a transformer according to embodiments of the present disclosure. A single turn of a primary-side auxiliary winding 1670 is located between a single turn of a secondary-side auxiliary winding 1680 and a primary winding 1975. Other turns of the auxiliary windings are not shown in order to improve the clarity of the disclosure, although it will be appreciated that a plurality of turns may be present.

For part of a turn of the primary-side auxiliary winding to be located between, or interposed between, a turn of the secondary-side auxiliary winding and the primary winding, a straight line drawn from a point within the part of the turn of the secondary-side winding to the closest point in the primary winding, may intersect with some part of the shield portion of the primary-side auxiliary winding. It is clear that the turn of the primary-side auxiliary winding 1670 shown in FIG. 16 will satisfy this condition. However, it is also clear that some lines, such as the dotted line 1684 shown, will extend from a point within the secondary-side auxiliary winding 1680 to the closest point within the primary winding 1675 without intersecting any part of the primary-side auxiliary winding 1670. Some parasitic capacitive coupling between the primary winding 1675 and the secondary-side auxiliary winding 1680 may therefore exist via these direct paths, where the primary-side auxiliary winding 1670 does not provide effective electric shielding. However, some effective shielding will still be provided so far as the portions of the secondary-side auxiliary winding are concerned where part of the primary-side auxiliary winding 1670 is interposed between the portion and the primary winding 1675.

Figure 17:
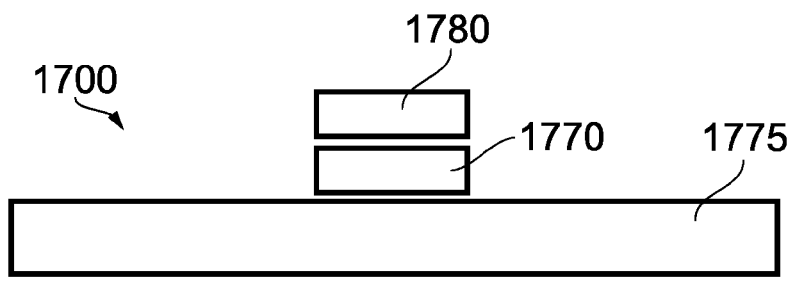
FIG. 17 shows a cross-section view of part of a transformer with a turn of a secondary-side auxiliary winding congruent to a turn of a primary-side auxiliary winding.

FIG. 17 shows a schematic diagram 1700 of a cross-section through part of a transformer according to embodiments of the present disclosure. A single turn of a primary-side auxiliary winding 1770 is located between a single turn of a secondary-side auxiliary winding 1780 and a primary winding 1775. Other turns of the auxiliary windings are not shown in order to improve the clarity of the disclosure.

Where the shortest path from any point in the secondary-side auxiliary winding 1780 to the closest point in the primary winding 1775 intersects with part of the primary-side auxiliary winding 1770 the secondary-side auxiliary winding 1780 may be said to be congruent to the primary-side auxiliary winding 1770, so far as the areas of the respective windings are concerned. Where the electric potential at any point on the secondary-side auxiliary winding 1780 is equal to the electric potential at the nearest point in the primary-side auxiliary winding 1770, then the secondary-side auxiliary winding 1780 and the primary-side auxiliary winding 1770 may be said to be congruent so far as their electric potentials are concerned. Where the primary-side auxiliary winding 1770 and the secondary-side auxiliary winding 1780 are congruent with respect to both area and electric potential then they may be said to be congruent in general terms.

Figure 18:
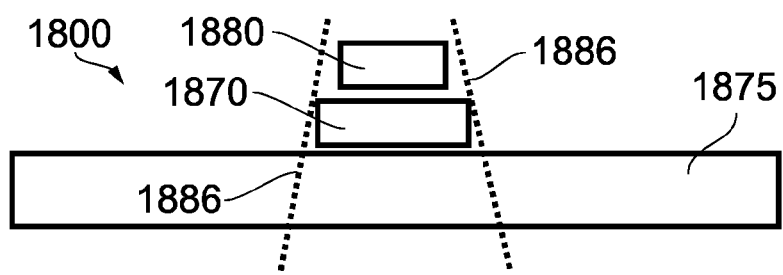
FIG. 18 shows a cross-section view of part of a transformer with a turn of a secondary-side auxiliary winding contained within a footprint of a turn of a primary-side auxiliary winding.

FIG. 18 shows a schematic diagram of a cross-section through part of a transformer according to embodiments of the present disclosure. A single turn of a primary-side auxiliary winding 1870 is located between a single turn of a secondary-side auxiliary winding 1880 and a primary winding 1875. Other turns of the auxiliary windings are not shown in order to improve the clarity of the disclosure.

In FIG. 18, it is possible to construct a pair of lines 1886, starting from within the primary winding 1875 and emanating outwards in a radial direction, that intersect with the edges of the cross-section of the primary-side auxiliary winding 1870. Such lines may be considered to define a footprint of the primary-side auxiliary winding 1870, the footprint being the area enclosed by the pair of lines and the part of the surface of the primary-side auxiliary winding nearest the secondary-side auxiliary winding 1880 intersected by the pair of lines 1886. Advantageously, the cross-section of the secondary-side auxiliary winding 1880 may be contained within the footprint of the primary-side auxiliary winding 1870. This arrangement may provide for effective electric shielding of the secondary-side auxiliary winding 1880 from the primary winding 1875 by the primary-side auxiliary winding 1870.

Figure 19:
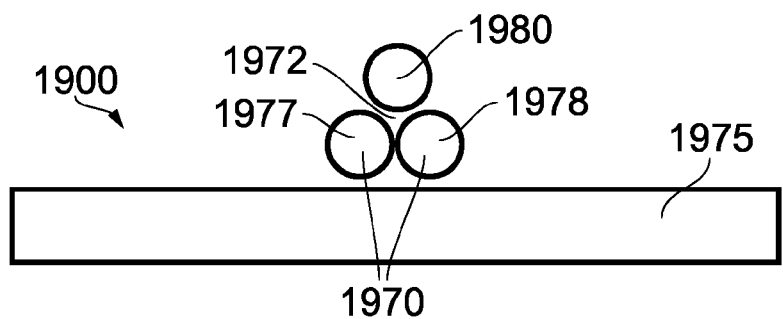
FIG. 19 shows a portion of a secondary-side auxiliary winding positioned over a portion of a primary-side auxiliary winding comprising a multicore conductor.

FIG. 19 shows a schematic diagram of a cross-section through part of a transformer according to embodiments of the present disclosure. A single turn of a primary-side auxiliary winding 1970 is located between a single turn of a secondary-side auxiliary winding 1980 and a primary winding 1975. Other turns of the auxiliary windings are not shown in order to improve the clarity of the disclosure.

The turns of the primary-side auxiliary winding 1970 may comprise a plurality of electrically conductive cores, or a multicore electrical conductor. In this example, the primary-side auxiliary winding 1970 comprises two conductive cores, a first core 1977 and a second core 1978. Together, the first core 1977 and the second core 1978 provide a groove 1972 into which the secondary-side auxiliary winding 1980 may advantageously be wound. By winding the secondary-side auxiliary winding 1980 into this groove 1972, the secondary-side auxiliary winding 1980 may be advantageously electrically shielded from the primary winding 1975. Furthermore, fabricating the secondary-side auxiliary winding 1980 may be advantageously facilitated by using such a multicore primary-side auxiliary winding 1970 as the secondary-side auxiliary core 1980 may easily be wound into the groove 1972.

It will be appreciated that a wide variety of electronic devices may comprise a transformer according to embodiments of the present disclosure. In some examples, such electronic devices may comprise a switched-mode power supply. In some examples such electronic devices may comprise an integrated circuit. In some examples such electronic devices may comprise an integrated circuit comprising a switched-mode power supply.

It will be appreciated that transformer windings may be configured in various different ways. The transformer will have a core, which may comprise a magnetic material or air. The core may be considered to extend along a length. With respect to the length of the core, a first winding may be wound around a first portion of the length of the core. A second winding may be wound around the first winding. A second winding may be wound around a second portion of the core that is adjacent to the first portion. Subsequent windings may be wound around other windings or wound around subsequent portions of the core that are adjacent to portions of the core around which other windings are wound. An example in which a plurality of windings are wound around separate respective portions of a core may be an integrated circuit. Some examples of windings in integrated circuits or printed circuit boards may comprise a single turn around a core. In such examples the plurality of windings may be spaced apart to wind around separate respective portions of the core. Adjacent windings may thereby enable a flow of current between the respective adjacent windings as a consequence of their parasitic capacitance. In such cases, embodiments of the present disclosure may advantageously be employed to reduce or remove common-mode noise.

Figure 20:
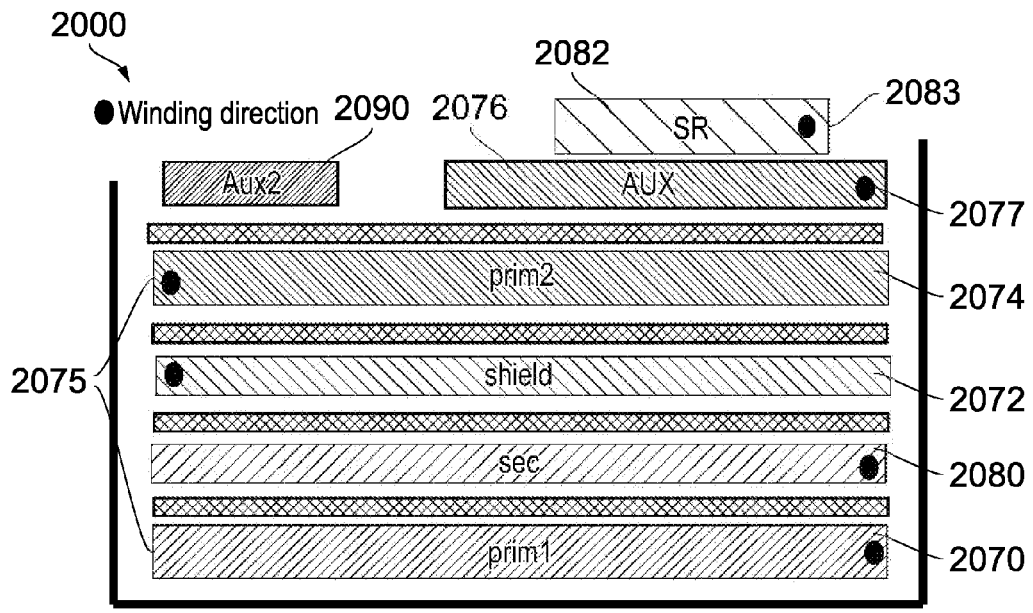
FIG. 20 shows a cross-section view of part of a transformer that is similar to the cross-section view shown in FIG. 11.

FIG. 20 shows a cross section view of part of a transformer 2000 that is similar to the cross-section view of FIG. 11. Similar features have been given similar reference numerals and will not necessarily be discussed further. In addition to the similar features, the transformer further comprises a second primary-side auxiliary winding 2090, located on the primary side of the transformer 2000, and wound around a portion of the main pair of windings 2075, 2080 that is spaced apart from the primary-side auxiliary winding 2076. The second primary-side auxiliary winding 2090 may be connected to the shield 2072 to provide a particular electric potential to the shield which may advantageously reduce the common-mode noise between the primary and secondary sides of the transformer 2000.

Figure 21:
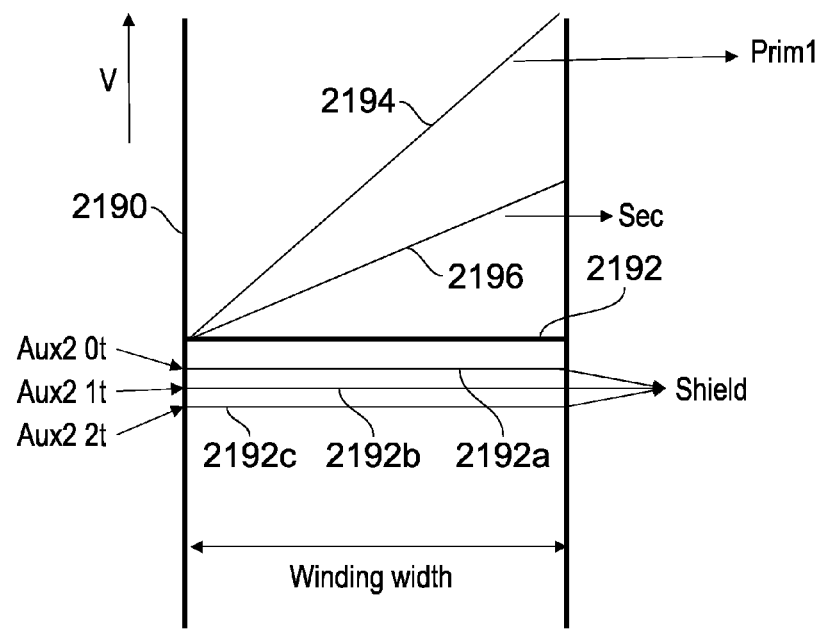
FIG. 21 shows a graph depicting the electric potential of different windings in the transformer of FIG. 20 at a particular point in time during operation of the transformer.

FIG. 21 shows a chart 2100 of the electric potential of some of the windings of the transformer of FIG. 20. This chart is similar to the chart shown in FIG. 6 and similar features have been given similar reference numerals and will not necessarily be described further here. The chart 2100 shows three different potential values 2192*a*, 2192*b*, 2192*c* for the shield, depending upon where on a second primary-side auxiliary winding the shilled is connected to. Such connection may be made to part of a particular turn of the second primary-side auxiliary winding. It will be appreciated that by making a connection between an appropriate turn of the second primary-side auxiliary winding and the shield, the shield potential may be chosen to have a value that reduces common-mode noise by providing for a flow of current between the shield and a secondary winding that complements or cancels out flow of current between a primary winding and the secondary winding. In this example, the shield potentials are all at negative values with respect to the potentials developed in the primary and secondary windings. This requires that the second primary-side auxiliary winding must be wound in the opposite sense to the primary and secondary windings. It will be appreciated that if the second primary-side auxiliary winding is wound in the same sense as the primary winding then it will develop a positive potential. Therefore, by choosing the winding sense of the second primary-side auxiliary winding and choosing an appropriate part of a turn of the second primary-side auxiliary winding to connect the shield to, any appropriate potential may be provided to the shield.

Figure 22:
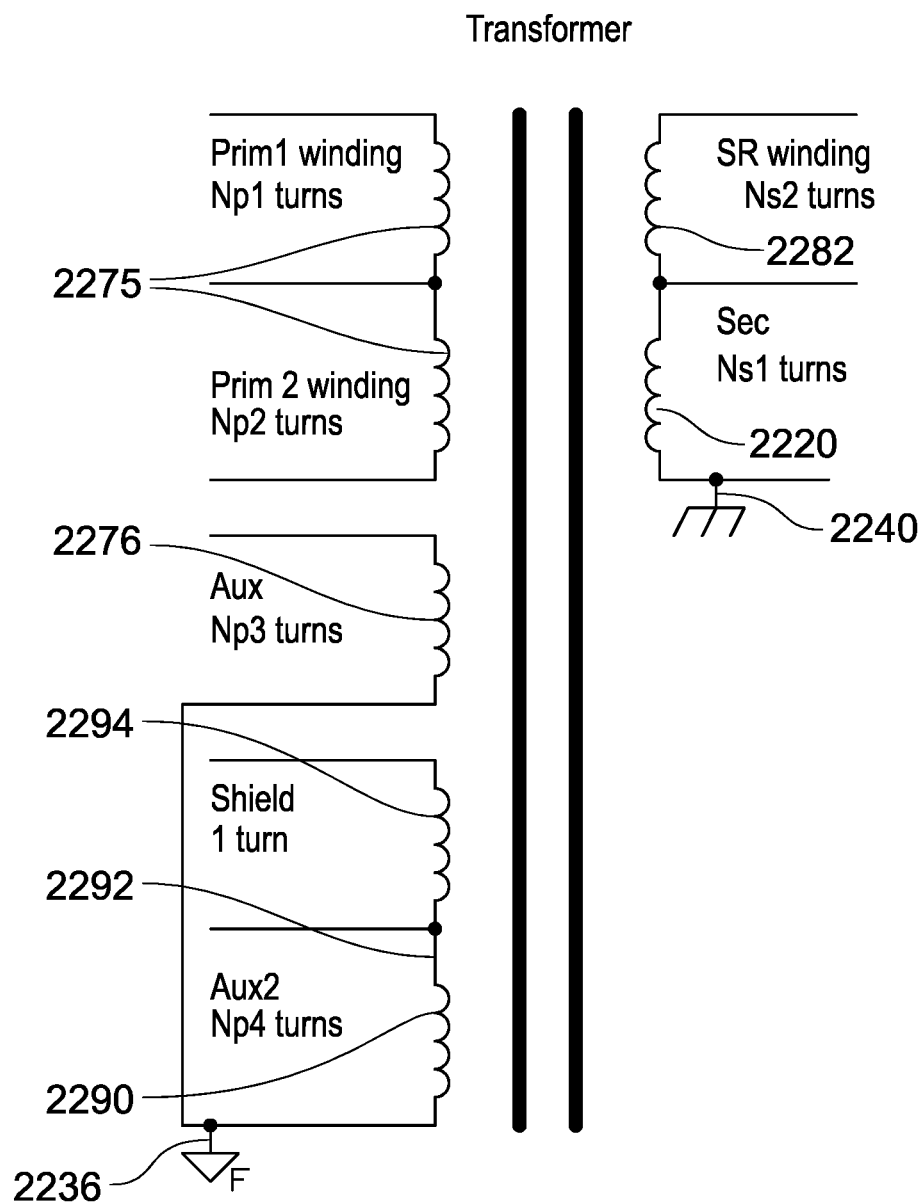
FIG. 22 shows a schematic circuit diagram of the transformer of FIG. 20.

FIG. 22 shows a schematic circuit diagram for a transformer 2200 similar to the transformer of FIG. 20. As this circuit diagram is similar in some respects to the circuit diagram of FIG. 12, similar reference numerals have been used to indicate similar features which may not necessarily be discussed further here. A second primary-side auxiliary winding 2290 is connected at one end to a primary-side reference terminal 2236. The other end 2292 of the second primary-side auxiliary winding 2290 is connected to the shield 2294, in order to provide an advantageous potential to the shield as described above in relation to FIG. 21. The shield 2294 may be considered to comprise a single turn winding.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A transformer, with a primary side and a secondary side, comprising:
 a main pair of windings, comprising:
  a primary winding on the primary side; and
  a secondary winding on the secondary side, configured, in use, to be inductively coupled to the primary winding;
 a secondary circuit comprising the secondary winding, an output terminal and a secondary-side reference terminal, the output terminal connected to a first end of the secondary winding, the secondary-side reference terminal connected to a second end of the secondary winding;
 a primary-side auxiliary winding on the primary side, connected at a first end to a primary-side reference terminal, wherein in use the primary-side auxiliary winding is configured to be inductively coupled to the primary winding in order to induce a first electric potential distribution in the primary-side auxiliary winding; and
 a secondary-side auxiliary winding on the secondary side, the secondary-side auxiliary winding having a reference end, wherein the reference end is connected to a reference terminal in the secondary circuit,
 wherein, in use, a first portion of the secondary-side auxiliary winding is configured to be inductively coupled to the primary winding in order to induce a second electric potential distribution in the secondary-side auxiliary winding;
 wherein:
  the primary-side auxiliary winding is physically located between (a) the main pair of windings; and (b) the second-side auxiliary winding; and a first portion of the secondary-side auxiliary winding is positioned adjacent to a shield-portion of the primary-side auxiliary winding in order to match the first electric potential distribution with the second electric potential distribution:
(1) along the respective lengths of the first portion of the secondary-side auxiliary winding and the shield-portion of the primary-side auxiliary winding; and
(2) over a frequency range that is greater than a particular threshold frequency.

2. The transformer of claim 1, wherein the reference terminal in the secondary circuit is between the first end of the secondary winding and the output terminal.

3. The transformer of claim 1, wherein the reference terminal in the secondary circuit is the output terminal.

4. The transformer of claim 1, wherein the reference terminal in the secondary circuit (to which the reference end of the secondary-side auxiliary winding is connected) is the first end of the secondary winding.

5. The transformer of claim 1, wherein the reference terminal in the secondary circuit (to which the reference end of the secondary-side auxiliary winding is connected) is the second end of the secondary winding.

6. The transformer of claim 1, further comprising:
a switch located in the secondary circuit between the first end of the secondary winding and the output terminal; and
a switch controller configured, in use, to receive power from the secondary-side auxiliary winding and to control the switch to provide synchronous rectification.

7. The transformer of claim 1, the primary-side auxiliary winding further comprising a second end and a midpoint tap, connected to an auxiliary power terminal, wherein the midpoint tap is connected to the primary-side auxiliary winding between the first end and the second end in order to extend a portion of the primary-side auxiliary winding between the midpoint tap and the second end.

8. The transformer of claim 1, wherein the secondary-side auxiliary winding further comprises a second portion, connected in series to the first portion of the secondary-side auxiliary winding, the first portion physically located between the second portion and the primary-side auxiliary winding.

9. The transformer of claim 1, wherein the shield portion of the primary-side auxiliary winding is interposed between the first portion of the secondary-side auxiliary winding and the main winding along the respective lengths of the first portion of the secondary-side auxiliary winding and the shield portion of the primary-side auxiliary winding.

10. The transformer of claim 1, wherein a footprint of the shield portion of the primary-side auxiliary winding, in a radial direction with respect to a geometric centre of the main pair of windings, completely contains the first portion of the secondary-side auxiliary winding along the respective lengths of the shield portion of the primary-side auxiliary winding and the first portion of the secondary-side auxiliary winding.

11. The transformer of claim 1, wherein the first portion of the secondary-side auxiliary winding is congruent, in a radial direction towards a geometric centre of the main pair of windings, to the shield portion of the primary-side auxiliary winding.

12. The transformer of claim 1, wherein the shield portion of the primary-side auxiliary winding comprises a multicore electrical conductor.

13. The transformer of claim 1, further comprising a shield connected to the primary winding and configured in order to:
position the secondary winding between the shield and the primary winding; and
in use, flow a first common-mode noise current between the shield and the secondary winding and flow a second common-mode noise current between the primary winding and the secondary winding;
wherein, the connection of the shield is to a part on the primary side, at a shield potential, selected in order to complement the first common-mode noise current to the second common-mode noise current.

14. The transformer of claim 1, wherein the particular threshold frequency is 9 kHz or 150 kHz.

15. An electronic device comprising the transformer of claim 1, wherein the electronic device is a switched-mode power supply and/or an integrated circuit.

* * * * *